(12) United States Patent
Gibbons et al.

(10) Patent No.: US 8,033,026 B2
(45) Date of Patent: Oct. 11, 2011

(54) ADJUSTABLE AND REMOVABLE KEEL ASSEMBLY AND BLADE GUIDE FOR A JIGSAW

(75) Inventors: Louis A. Gibbons, Stevensvillle, MD (US); John S. Vantran, Parkton, MD (US); Mark E. Robson, Berkshire (GB); Timothy McKay, Ashington (GB); Brent A. Kuehne, Red Lion, PA (US); Terry L. Turner, Towson, MD (US); Michael F. Cannaliato, Bel Air, MD (US); Thomas R. Kaye, Jr., Fallston, MD (US)

(73) Assignee: Black & Decker Inc., Newark, DE (US)

( * ) Notice: Subject to any disclaimer, the term of this patent is extended or adjusted under 35 U.S.C. 154(b) by 807 days.

(21) Appl. No.: 11/859,172

(22) Filed: Sep. 21, 2007

(65) Prior Publication Data

US 2009/0077816 A1 Mar. 26, 2009

(51) Int. Cl.
*B27B 11/02* (2006.01)
(52) U.S. Cl. .......................... 30/371; 30/392
(58) Field of Classification Search .............. 30/371, 30/373, 392–394
See application file for complete search history.

(56) References Cited

U.S. PATENT DOCUMENTS

| | | | |
|---|---|---|---|
| 1,102,018 A | 6/1914 | Dodds | |
| 2,377,673 A * | 6/1945 | Chaddock | 30/373 |
| 2,623,557 A | 12/1952 | Kendall | |
| 2,749,951 A | 6/1956 | Tetzner | |
| 2,775,272 A | 12/1956 | Papworth | |
| 2,819,742 A * | 1/1958 | Blachly | 30/373 |
| 2,916,062 A * | 12/1959 | Clauson | 30/373 |
| 2,934,106 A | 4/1960 | Chapman et al. | |
| 3,087,519 A | 4/1963 | McCarty et al. | |
| 3,093,773 A | 6/1963 | Cole | |
| 3,109,465 A | 11/1963 | Smith | |
| 3,116,768 A | 1/1964 | Lasar | |
| 3,131,736 A | 5/1964 | Ristow et al. | |
| 3,146,809 A | 9/1964 | Botefuhr | |
| 3,353,573 A | 11/1967 | Hitzeroth | |
| 3,374,814 A | 3/1968 | Kaufmann | |
| 3,388,728 A | 6/1968 | Riley, Jr. et al. | |
| 3,456,698 A | 7/1969 | Csaki | |
| 3,457,796 A | 7/1969 | Leach et al. | |
| 3,461,732 A | 8/1969 | Gregory | |
| 3,478,786 A | 11/1969 | Hendrickson | |
| 3,542,097 A | 11/1970 | Dudek | |
| 3,805,383 A | 4/1974 | McNally | |
| 3,834,019 A | 9/1974 | Smeltzer et al. | |

(Continued)

FOREIGN PATENT DOCUMENTS

DE 716 266 1/1942

(Continued)

*Primary Examiner* — Stephen Choi
(74) *Attorney, Agent, or Firm* — Harness, Dickey & Pierce, P.L.C.

(57) ABSTRACT

A jigsaw includes a housing containing a motor activated by a trigger assembly. A shoe member is pivotally connected to the housing of the jigsaw and establishes an angle therebetween. The jigsaw includes a keel assembly includes a blade member that generally extends from the housing beyond the shoe member. The keel assembly remains generally in line with the housing as the angle between the shoe member and the housing varies. The jigsaw also includes a latch assembly capable of retaining and releasing the keel assembly from the housing.

19 Claims, 8 Drawing Sheets

U.S. PATENT DOCUMENTS

| | | |
|---|---|---|
| 3,938,251 A | 2/1976 | Kareman |
| 3,969,796 A | 7/1976 | Hodsdon et al. |
| 3,973,324 A | 8/1976 | Persson |
| 4,090,297 A | 5/1978 | Wanner et al. |
| 4,137,632 A | 2/1979 | Pfanzer |
| 4,191,917 A | 3/1980 | Brown et al. |
| 4,213,242 A | 7/1980 | Partington |
| 4,238,884 A | 12/1980 | Walton, II |
| 4,240,204 A | 12/1980 | Walton, II et al. |
| 4,250,624 A | 2/1981 | Partington |
| 4,255,006 A | 3/1981 | King |
| 4,255,858 A | 3/1981 | Getts |
| 4,257,297 A | 3/1981 | Nidbella |
| 4,262,421 A | 4/1981 | Bergler et al. |
| 4,272,889 A | 6/1981 | Scott et al. |
| 4,283,855 A | 8/1981 | Nalley |
| 4,351,112 A | 9/1982 | Nalley |
| 4,377,003 A | 3/1983 | Abe et al. |
| 4,545,123 A | 10/1985 | Hartmann |
| 4,614,037 A | 9/1986 | Somers |
| 4,628,459 A | 12/1986 | Shinohara et al. |
| 4,628,605 A | 12/1986 | Clowers |
| 4,636,961 A | 1/1987 | Bauer |
| 4,665,617 A | 5/1987 | Maier et al. |
| 4,675,999 A | 6/1987 | Ito et al. |
| 4,693,009 A | 9/1987 | Bone |
| 4,730,397 A | 3/1988 | Weiford et al. |
| 4,833,782 A | 5/1989 | Smith |
| 4,837,935 A | 6/1989 | Maier et al. |
| 4,932,294 A | 6/1990 | Chang |
| 4,962,681 A | 10/1990 | Yang |
| 4,969,830 A | 11/1990 | Daly et al. |
| 4,973,205 A | 11/1990 | Spaulding |
| 5,010,652 A | 4/1991 | Miletich |
| 5,012,583 A | 5/1991 | Blochle et al. |
| 5,038,481 A | 8/1991 | Smith |
| 5,119,705 A | 6/1992 | Rosenberger et al. |
| 5,205,043 A | 4/1993 | Batt et al. |
| 5,208,525 A | 5/1993 | Lopic et al. |
| 5,273,462 A | 12/1993 | Huser et al. |
| 5,279,037 A * | 1/1994 | Leatherman .................... 30/373 |
| 5,445,479 A | 8/1995 | Hillinger |
| 5,535,437 A | 7/1996 | Karl et al. |
| 5,549,145 A | 8/1996 | Bearden |
| 5,617,638 A | 4/1997 | Amano et al. |
| 5,644,845 A | 7/1997 | Durr et al. |
| 5,644,846 A | 7/1997 | Durr et al. |
| 5,644,847 A | 7/1997 | Odendahl et al. |
| 5,675,899 A | 10/1997 | Webb |
| 5,680,704 A | 10/1997 | Okubo et al. |
| 5,716,730 A | 2/1998 | Deguchi |
| 5,727,322 A | 3/1998 | Giacometti |
| 5,778,538 A | 7/1998 | Gentinetta et al. |
| 5,784,800 A | 7/1998 | Santhouse et al. |
| 5,813,805 A | 9/1998 | Kopras |
| 5,902,080 A | 5/1999 | Kopras |
| 5,996,460 A | 12/1999 | Waite |
| 6,017,242 A | 1/2000 | Kerrigan |
| 6,021,826 A | 2/2000 | Daniell |
| 6,157,545 A | 12/2000 | Janninck et al. |
| 6,178,646 B1 | 1/2001 | Schnell et al. |
| 6,189,217 B1 | 2/2001 | Melvin et al. |
| D440,474 S | 4/2001 | Heun |
| 6,220,888 B1 | 4/2001 | Correa |
| 6,230,411 B1 | 5/2001 | Wall et al. |
| 6,305,089 B1 | 10/2001 | Berndt |
| 6,334,743 B1 | 1/2002 | Liao |
| 6,357,123 B1 | 3/2002 | Manuel |
| 6,357,124 B1 | 3/2002 | Wall et al. |
| 6,397,717 B1 | 6/2002 | Waite |
| 6,412,181 B1 | 7/2002 | Pracas |
| 6,443,675 B1 | 9/2002 | Kopras et al. |
| 6,449,851 B1 | 9/2002 | Bone et al. |
| D463,963 S | 10/2002 | Metaxatos |
| 6,484,409 B2 | 11/2002 | Campbell et al. |
| 6,510,772 B2 | 1/2003 | Brickner, Jr. et al. |
| 6,553,642 B2 | 4/2003 | Driessen |
| 6,553,675 B2 | 4/2003 | Orrico |
| D474,384 S | 5/2003 | Andriolo |
| D476,871 S | 7/2003 | Santarsiero et al. |
| 6,625,892 B2 | 9/2003 | Takahashi et al. |
| 6,691,417 B2 | 2/2004 | Campbell et al. |
| 6,705,017 B2 | 3/2004 | Ellis et al. |
| 6,755,107 B2 | 6/2004 | Peot et al. |
| 6,769,188 B2 | 8/2004 | Dorner et al. |
| 6,877,234 B2 | 4/2005 | Saegesser et al. |
| 6,890,135 B2 | 5/2005 | Kopras et al. |
| 6,892,459 B2 | 5/2005 | Okumura et al. |
| 6,902,356 B2 | 6/2005 | Breitenmoser |
| 6,912,788 B2 | 7/2005 | Tam et al. |
| 6,920,694 B2 | 7/2005 | Hecht et al. |
| D519,014 S | 4/2006 | Aglassinger |
| D519,805 S | 5/2006 | Ng |
| D519,806 S | 5/2006 | Waldron |
| D520,318 S | 5/2006 | Waldron |
| D521,834 S | 5/2006 | Andriolo et al. |
| D522,335 S | 6/2006 | Houghton |
| 7,065,884 B2 | 6/2006 | Tam et al. |
| D524,622 S | 7/2006 | Corcoran |
| 7,094,011 B2 | 8/2006 | Kopras et al. |
| 7,111,405 B2 | 9/2006 | Delfini et al. |
| D532,664 S | 11/2006 | Wu |
| 7,131,180 B2 | 11/2006 | Kopras et al. |
| 7,131,206 B2 | 11/2006 | Wu |
| 7,152,329 B2 | 12/2006 | Kondo et al. |
| 7,234,243 B2 | 6/2007 | Tam et al. |
| 7,328,514 B2 | 2/2008 | Park |
| 7,503,121 B2 | 3/2009 | Powell et al. |
| 7,509,744 B2 | 3/2009 | Walker |
| 7,513,047 B2 | 4/2009 | Wu |
| 7,526,867 B2 | 5/2009 | Park |
| 7,562,457 B2 | 7/2009 | Prieto |
| 2002/0131267 A1 | 9/2002 | Van Osenbruggen |
| 2002/0197123 A1 | 12/2002 | Kopras et al. |
| 2003/0000355 A1 | 1/2003 | Butler et al. |
| 2003/0121389 A1 | 7/2003 | Wheeler et al. |
| 2003/0145472 A1 | 8/2003 | Swift |
| 2003/0196338 A1 | 10/2003 | Eto et al. |
| 2003/0233921 A1 | 12/2003 | Garcia et al. |
| 2004/0040161 A1 | 3/2004 | Houben et al. |
| 2004/0049927 A1 | 3/2004 | Wu |
| 2004/0112187 A1 | 6/2004 | Chen |
| 2004/0128843 A1 | 7/2004 | Walker |
| 2004/0168561 A1 | 9/2004 | Tam et al. |
| 2004/0261274 A1 | 12/2004 | Tam et al. |
| 2005/0060896 A1 | 3/2005 | Park |
| 2005/0195592 A1 | 9/2005 | Hsu et al. |
| 2005/0217448 A1 | 10/2005 | Walker |
| 2005/0223571 A1 | 10/2005 | Park et al. |
| 2005/0229408 A1 | 10/2005 | Ngan et al. |
| 2005/0252007 A1 | 11/2005 | Critelli et al. |
| 2005/0257383 A1 | 11/2005 | Million |
| 2005/0257384 A1 | 11/2005 | Million |
| 2005/0257385 A1 | 11/2005 | Walker |
| 2005/0262707 A1 | 12/2005 | Wu |
| 2005/0283984 A1 | 12/2005 | Walmsley |
| 2006/0064882 A1 | 3/2006 | Wilson et al. |
| 2006/0080850 A1 | 4/2006 | Firth |
| 2006/0090355 A1 | 5/2006 | Di Nicolantonio |
| 2006/0101969 A1 | 5/2006 | Garcia et al. |
| 2006/0104732 A1 | 5/2006 | Huang |
| 2006/0117580 A1 | 6/2006 | Serdynski et al. |
| 2006/0143928 A1 | 7/2006 | Wu |
| 2006/0168824 A1 | 8/2006 | Roberts |
| 2006/0185173 A1 | 8/2006 | Wadge et al. |
| 2006/0191140 A1 | 8/2006 | Wadge et al. |
| 2006/0196059 A1 | 9/2006 | Berto |
| 2006/0288592 A1 | 12/2006 | Roberts |
| 2007/0068012 A1 | 3/2007 | Chen |
| 2007/0101586 A1 | 5/2007 | Felder et al. |
| 2007/0180711 A1 | 8/2007 | Park |
| 2007/0186425 A1 | 8/2007 | Tam et al. |
| 2008/0222901 A1* | 9/2008 | Kaiser et al. .................... 30/392 |
| 2008/0229589 A1 | 9/2008 | Bone |
| 2008/0244910 A1 | 10/2008 | Patel |
| 2009/0313831 A1 | 12/2009 | Patel |

FOREIGN PATENT DOCUMENTS

| | | |
|---|---|---|
| DE | 1 760 076 | 1/1958 |
| DE | 1 795 934 | 9/1959 |
| DE | 1 628 899 | 8/1971 |
| DE | 23 03 532 | 8/1974 |
| DE | 24 35 845 | 2/1976 |
| DE | 26 50 470 | 5/1978 |
| DE | 80 33 115 | 5/1981 |
| DE | 30 21 801 | 12/1981 |
| DE | 31 18758 | 12/1982 |
| DE | 32 22 426 | 12/1983 |
| DE | 3403762 A1 | 8/1985 |
| DE | 34 08 847 | 11/1985 |
| DE | 34 46 278 | 6/1986 |
| DE | 35 43 764 | 6/1986 |
| DE | 35 09 515 | 9/1986 |
| DE | 8507818 U1 | 2/1987 |
| DE | 36 08 301 | 9/1987 |
| DE | 88 08 046 U1 | 10/1988 |
| DE | 35 46 547 | 5/1989 |
| DE | 35 46 700 | 10/1990 |
| DE | 39 21 891 | 1/1991 |
| DE | 40 27 135 | 3/1992 |
| DE | 93 07 337 | 8/1993 |
| DE | 43 20 233 | 6/1994 |
| DE | 43 16 155 | 11/1994 |
| DE | 195 13 078 | 10/1996 |
| DE | 196 04 938 | 2/1997 |
| DE | 296 15 634 U | 4/1997 |
| DE | 196 09 388 | 9/1997 |
| DE | 29910173 U1 | 9/1999 |
| DE | 199 26 387 | 12/2000 |
| DE | 201 20 529 U | 4/2002 |
| DE | 102 15 871 | 10/2003 |
| DE | 202 20 893 U | 6/2004 |
| DE | 10 2004 042 025 | 3/2006 |
| DE | 102004043564 | 3/2006 |
| DE | 102004051350 | 4/2006 |
| DE | 20 2006 004 715 U | 6/2006 |
| DE | 102004 063 174 | 7/2006 |
| DE | 102005025934 | 12/2006 |
| EP | 0 347 631 | 12/1989 |
| EP | 0 504 745 | 9/1992 |
| EP | 0 521 263 | 1/1993 |
| EP | 0 603 552 | 6/1994 |
| EP | 0 716 897 | 6/1996 |
| EP | 0 716 898 | 6/1996 |
| EP | 0 736 353 | 10/1996 |
| EP | 0 826 453 | 3/1998 |
| EP | 0 967 040 B1 | 12/1999 |
| EP | 0 970 771 | 1/2000 |
| EP | 1 188 505 | 3/2002 |
| EP | 1 328 369 | 4/2002 |
| EP | 1 258 305 | 11/2002 |
| EP | 1 001 866 B1 | 3/2004 |
| EP | 1 586 399 | 10/2005 |
| EP | 1 658 936 | 5/2006 |
| EP | 1 679 144 | 7/2006 |
| EP | 1 437 203 B1 | 12/2006 |
| EP | 1 595 631 B1 | 2/2007 |
| GB | 221671 | 9/1924 |
| GB | 2075421 A | 11/1981 |
| GB | 2300145 A | 10/1996 |
| GB | 2 310 905 | 9/1997 |
| GB | 2 330 328 | 4/1999 |
| GB | 2 336 805 | 11/1999 |
| GB | 2 337 228 | 11/1999 |
| GB | 2 399 314 | 9/2004 |
| GB | 2 399 315 | 9/2004 |
| GB | 2 406 071 | 3/2005 |
| JP | 2000 343309 | 12/2000 |
| JP | 2002 337102 | 11/2002 |
| WO | WO 8605427 | 9/1986 |
| WO | WO 02/22297 | 3/2002 |
| WO | WO/02/057042 | 7/2002 |
| WO | WO 03/106087 | 12/2003 |

\* cited by examiner

ADJUSTABLE AND REMOVABLE KEEL ASSEMBLY AND BLADE GUIDE FOR A JIGSAW

FIELD

The present teachings relate to a jigsaw and more particularly relate to an adjustable and removable keel attachment that can remain in line with a housing of the jigsaw, while a shoe member is pivoted relative to the housing.

BACKGROUND

Typically, a keel blade can be attached to a jigsaw to provide a relatively more accurate straight cut through a piece of sheet material than a jigsaw without the keel blade. The keel blade is traditionally attached to and removed from a housing of the jigsaw using tools and multiple fasteners, which can be a relatively complex process. In some instances, the keel blade needs to be uncoupled from the housing to perform a bevel cut.

SUMMARY

The present teachings generally include a jigsaw that includes a housing containing a motor activated by a trigger assembly. A shoe member is pivotally connected to the housing and establishes an angle therebetween. The jigsaw includes a keel assembly that includes a blade member that generally extends from the housing beyond the shoe member. The keel assembly remains generally in line with the housing as the angle between the shoe member and the housing varies. The jigsaw also includes a latch assembly capable of retaining and releasing the keel assembly from the housing.

Further areas of applicability will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings.

DETAILED DESCRIPTION

The following description is merely exemplary in nature and is not intended to limit the present teachings, their application or uses. It should be understood that throughout the drawings, corresponding reference numerals indicate like or corresponding parts and features.

Moreover, certain terminology can be used for the purpose of reference only and do not limit the present teachings. For example, terms such as "upper," "lower," "above" and "below" can refer to directions in the drawings to which reference is made. Terms such as "front," "back," "rear" and "side" can describe the orientation of portions of the component, function, system, etc. within a consistent but arbitrary frame of reference which can be made more clear by reference to the text and the associated drawings describing the component, function, system, etc. under discussion. Such terminology may include the words specifically mentioned above, derivatives thereof and words of similar import. Similarly, the terms "first," "second" and other such numerical terms referring to structures, systems and/or methods do not imply a sequence or order unless clearly indicated by the context.

Figure 1:
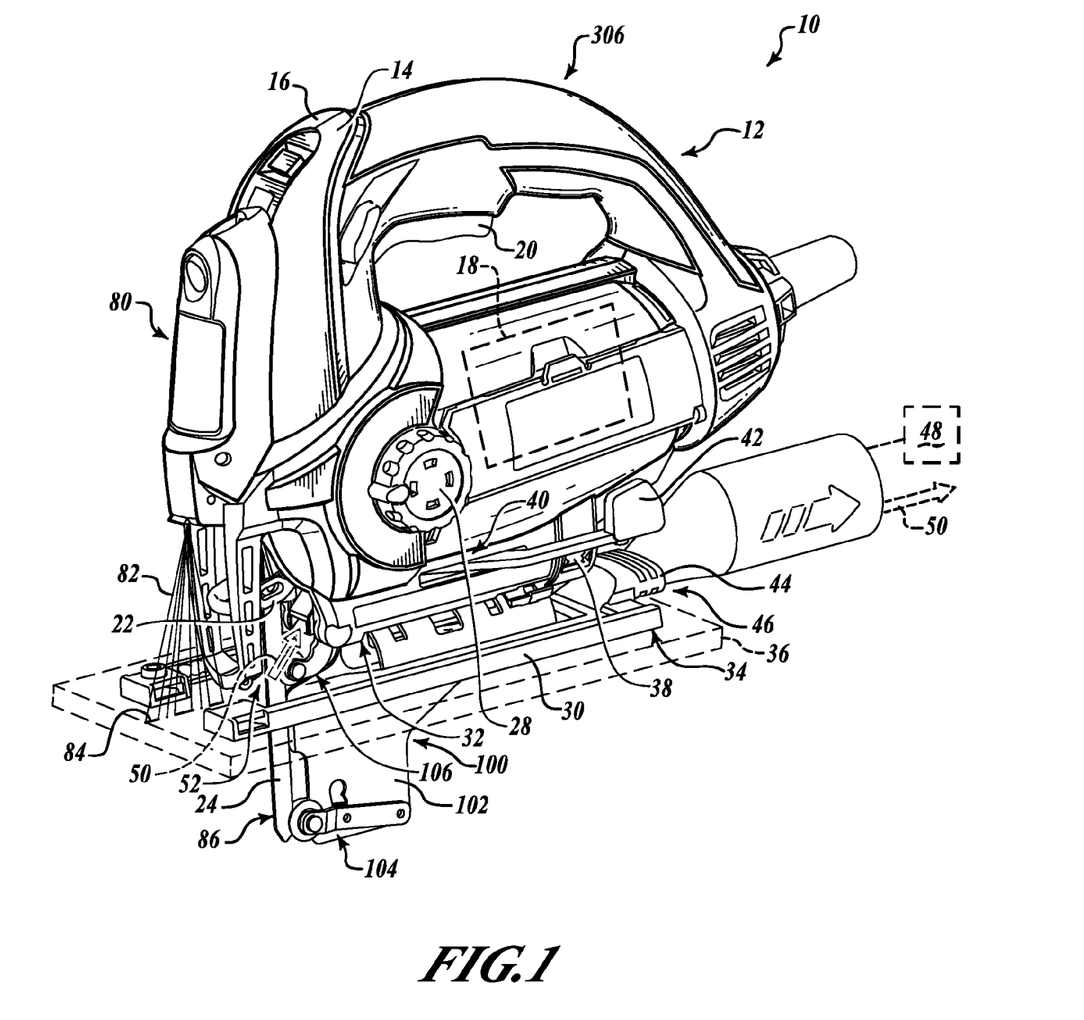
FIG. 1 is a perspective view of a jigsaw having a keel assembly attached to a housing of the jigsaw in accordance with the present teachings.
Figure 7:
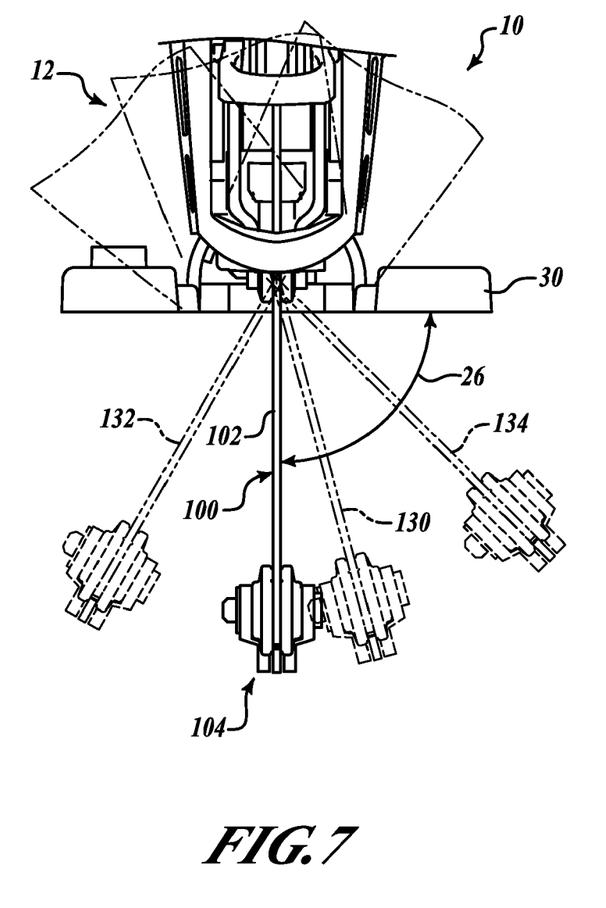
FIG. 7 is a partial front view of a jigsaw having a keel assembly disposed at various angles relative to a shoe member to establish various cutting angles in accordance with the present teachings.

With reference to FIG. 1, a jigsaw 10 generally includes a housing 12 that can be formed of two half shells 14, 16. The housing 12 can contain a motor 18. When activated by a trigger assembly 20, the motor 18 can provide a reciprocating and/or pendulum motion to a cutting blade holder 22 on the end of a reciprocating shaft to drive a cutting blade 24 at one or more cutting angles 26 (FIG. 7). A control member 28 on a side of the housing 12 can control a rate of the reciprocation and/or a magnitude of the pendulum motion of the cutting blade holder 22 on the reciprocating shaft and thus the cutting blade 24.

A shoe member 30 can be coupled to a bottom 32 of the housing 12 in such a way as to permit the shoe member 30 to pivot relative to the housing 12. As the shoe member 30 pivots relative to the housing 12, the cutting blade holder 22, the cutting blade 24, etc., can be orientated at various angles (i.e., one or more of the cutting angles 26 (FIG. 7)) relative to the shoe member 30. A bottom surface 34 of the shoe member 30 can abut a workpiece 36, which can be wood, plastic, metal, other suitable materials and one or more combinations thereof and can be in the form of pipe, sheet material, stock material, other suitable forms and/or materials and one or more combinations thereof. The shoe member 30 can be pivoted relative to the housing 12 to adjust the cutting angle 26 (FIG. 7) of the jigsaw 10, e.g., at a forty-five degree cutting angle.

As the shoe member 30 is moved relative to the housing 12, an angle indicator wheel 38 can be rotatably coupled to the shoe member 30 and can indicate the cutting angle 26 of the jigsaw 10. Further, a locking mechanism 40 can include a bevel lever 42 that can be adjusted between an unlocked condition and a locked condition, as shown in FIG. 1. In the unlocked condition the locking mechanism 40 can permit the shoe member 30 to pivot relative to the housing 12. In the locked condition, as illustrated in FIG. 1, the locking mechanism 40 can prevent the shoe member 30 from pivoting relative to the housing 12. The cutting angle 26 (FIG. 7) to which the shoe member 30 can be pivoted relative to the housing 12, when the locking mechanism 40 is in the unlocked condition, can be indicated by the angle indicator wheel 38.

A dust extraction port 44 can be formed on a rear portion 46 of the shoe member 30 such that a vacuum source 48 can be connected with various suitable connections to the dust extraction port 44. A dust extraction airflow 50 can be extracted from a cutting area 52. From the cutting area 52, the dust extraction airflow 50 can move through an airflow pathway formed in the shoe member 30 and directed out of the dust extraction port 44.

The jigsaw 10 can include a laser module 80. The laser module 80 can project a laser light 82 and can produce a laser light pattern 84. The laser light pattern 84 can produce, for example, a sequence of dashes and/or dots beyond a front side 86 of the cutting blade 24 and can highlight a path of the cutting blade 24 through the workpiece 36.

The jigsaw 10 can also include a keel assembly 100 that can provide additional straight-line accuracy when cutting a straight line in the workpiece 36 (e.g., can help avoid wandering of the jigsaw cutting path). The keel assembly 100 can be pivoted with the housing 12 when the shoe member 30 is moved at an angle (i.e., the one or more cutting angles 26 (FIG. 7)) relative to the housing 12. In this regard, the shoe member 30 can be pivoted relative to the housing 12 but the keel assembly 100 can remain generally in line with the housing 12 so as to provide, for example, a straight bevel cut through the workpiece 36, i.e., the cutting angle is not perpendicular to the workpiece 36 but the cutting path through the workpiece 36 is straight.

The keel assembly 100 can be connected to the bottom 32 of the housing 12. The shoe member 30 can extend from the housing 12 beyond the shoe member 30 and distally outward (i.e., downward) from the bottom 32 of the jigsaw 10. The keel assembly 100 can include a keel blade member 102 to which a lower guide assembly 104 can be attached. The lower guide assembly 104 can be spaced at various predetermined distances from an upper guide assembly 106 that extends from the housing 12. By adjusting the lower guide assembly 104 relative to the upper guide assembly 106, the distance between the assemblies 104, 106 can be adjusted to accommodate workpieces having different thicknesses.

Figure 2:
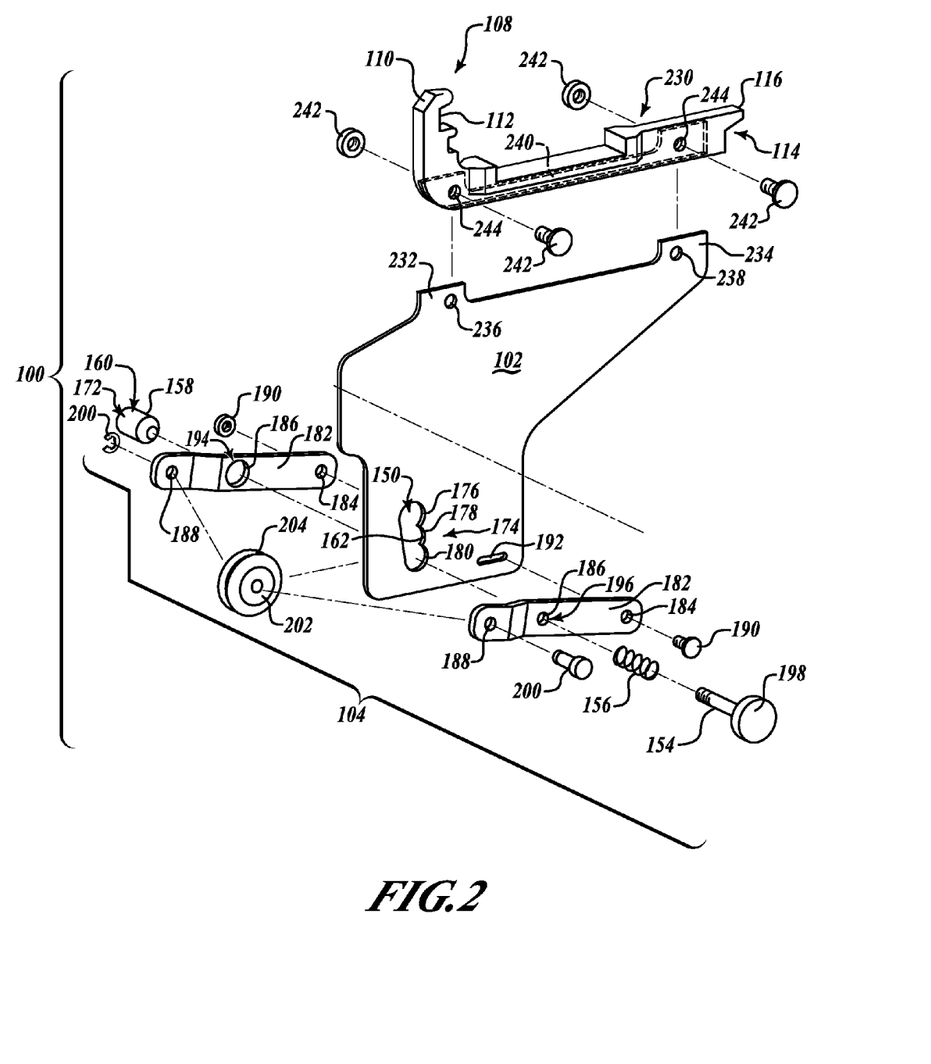
FIG. 2 is an exploded assembly view of the keel assembly including a lower carrier assembly that can be repositioned relative to a blade member of the keel assembly to provide support for a rear edge of a cutting blade in accordance with the present teachings.
Figure 3:
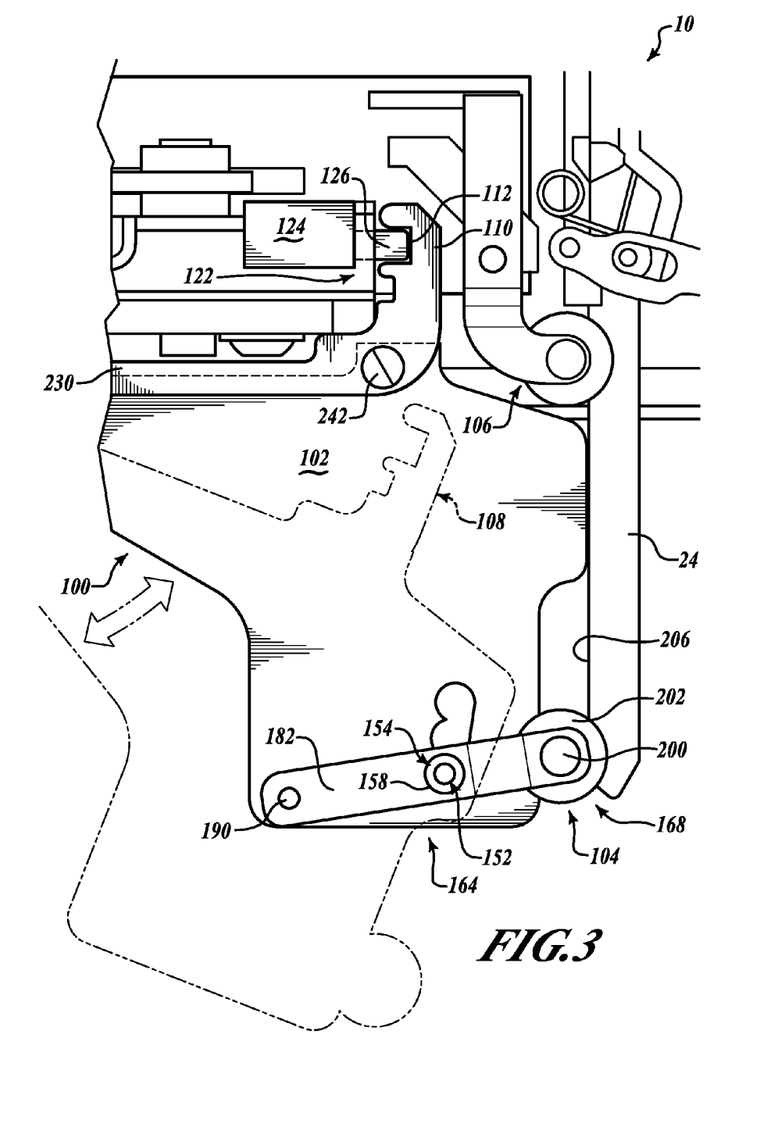
FIG. 3 is a side view of a front connection portion of the keel assembly and a front connection portion of the housing to where the front connection portion of the keel assembly is retained when the keel assembly is coupled to the housing in accordance with the present teachings.
Figure 4:
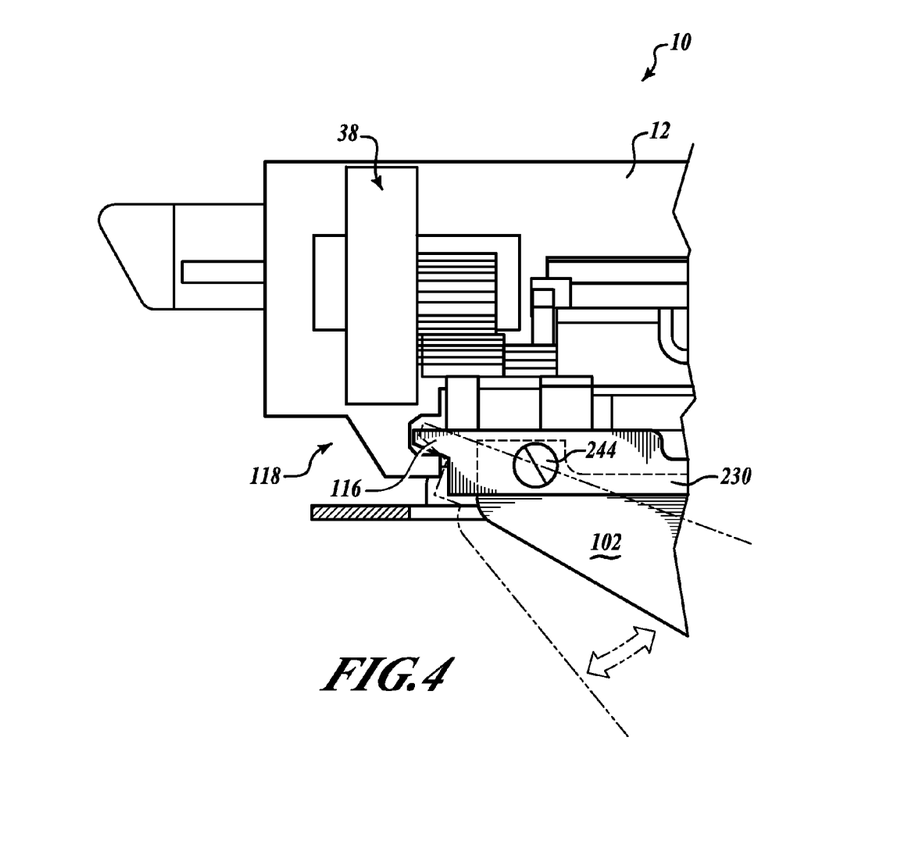
FIG. 4 is a partial cross-sectional side view of a rear connection portion of the keel assembly that can connect to and pivot about a rear connection portion of the housing in accordance with the present teachings.

With reference to FIGS. 2 and 3, the keel assembly 100 can also include a front connection portion 108 that can have a flange 110 in which an aperture 112 can be formed. The keel assembly 100 can further include a rear connection portion 114 that can define a lip 116. A rear connection portion 118 in the housing 12 can accept the lip 116 of the rear connection portion 114. In this regard, the rear connection portion 114 of the keel assembly 100 can be received by the rear connection portion 118 of the housing 12 so that the lip 116 can pivot about the rear connection portion 118 of the housing 12.

As illustrated in FIG. 3, the keel assembly 100 can swing upwards so as to position the front connection portion 108 of the keel assembly 100 into engagement with a front connection portion 120 of the housing 12. The keel assembly 100 can also swing downwards when uncoupled from the housing 12 (illustrated in phantom line). When connecting the keel assembly 100 to the housing 12, the aperture 112 formed in the flange 110 can be accepted by a latch assembly 122 in the front connection portion 120 of the housing 12.

Figure 6:
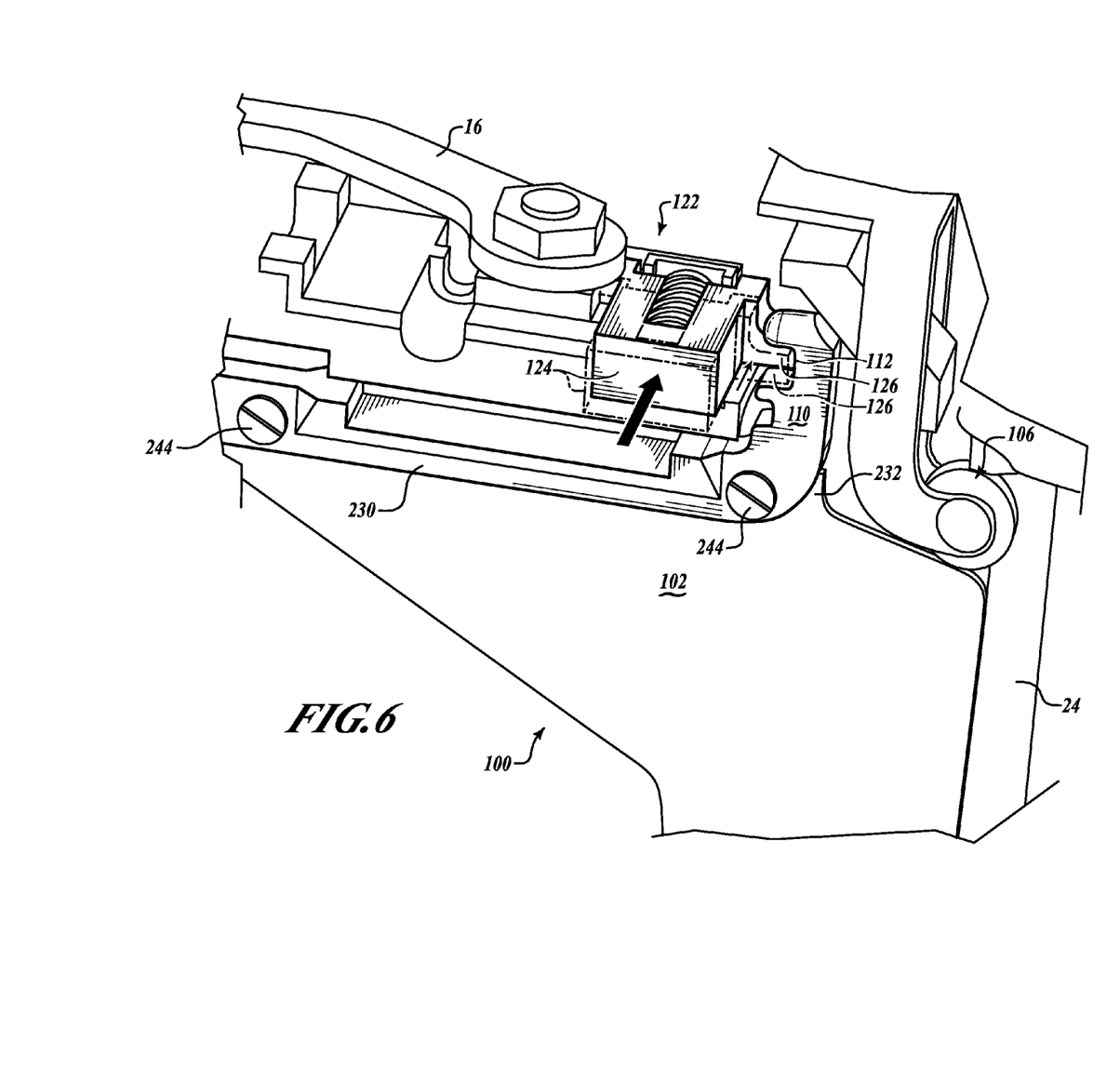
FIG. 6 is a partial perspective view of a latch assembly in the front connection portion of the jigsaw housing that can be pressed or otherwise retracted to release a front connection portion of the keel assembly so that the keel assembly can be uncoupled from the housing in accordance with the present teachings.

With reference to FIG. 6, the latch assembly 122 can include an actuator member 124 that can be pushed, retracted or the like. In one example, pushing the actuator member 124 into the latch assembly 122 can move a post 126 so as to move the post 126 out of the aperture 112 in the flange 110 of the front connection portion 108 of the keel assembly 100. By way of the above example, the actuator member can be pushed by one or more fingers, thumbs, etc. of the user. With reference to FIG. 3, with the front connection portion 108 no longer held by the latch assembly 122, the keel assembly 100 can swing downward about the lip 116 that can be held in the rear connection portion 118. As such, the keel assembly 100 can be uncoupled from the housing 12 via a hand operation and therefore no tools are required to do so.

In another example, pressing the actuator member 124 can release a bias on the post 126 so that the post 126 can move (e.g., retract) when the keel assembly 100 is pulled away from the housing 12. Notwithstanding the specific mechanism that can move the post 126, when the actuator member 124 is in the extended position (e.g., not pressed by a user), the post 126 can be held by the aperture 112 formed in the front connection portion 108 of the keel assembly 100 to secure the keel assembly 100 to the housing 12.

With reference to FIG. 7, the keel assembly 100 can be secured to the housing 12 and the keel assembly 100 can remain in-line with the housing 12, while the jigsaw 10 is moved relative to the shoe member 30 to establish the various cutting angles 26. The one or more cutting angles 26 of the cutting blade 24 (FIG. 1) of the jigsaw 10 are illustrated such that the cutting angle 26 (illustrated in solid line) is positioned at a zero degree cutting angle, i.e., a perpendicular cutting angle relative to the shoe member 30.

In further aspects, a cutting angle 130 (shown in phantom line) can be positioned at about positive fifteen degrees, while a cutting angle 132 (shown in phantom line) can be positioned at about negative thirty degrees. A cutting angle 134 (shown in phantom line) can be positioned at about positive forty five degrees. It will be appreciated in light of the disclosure that various cutting angles can be implemented including, but not limited to, those cutting angles illustrated in FIG. 7. In one aspect, the keel assembly 100 can be removed from the housing 12 regardless and at any of the cutting angles implemented.

Figure 5:
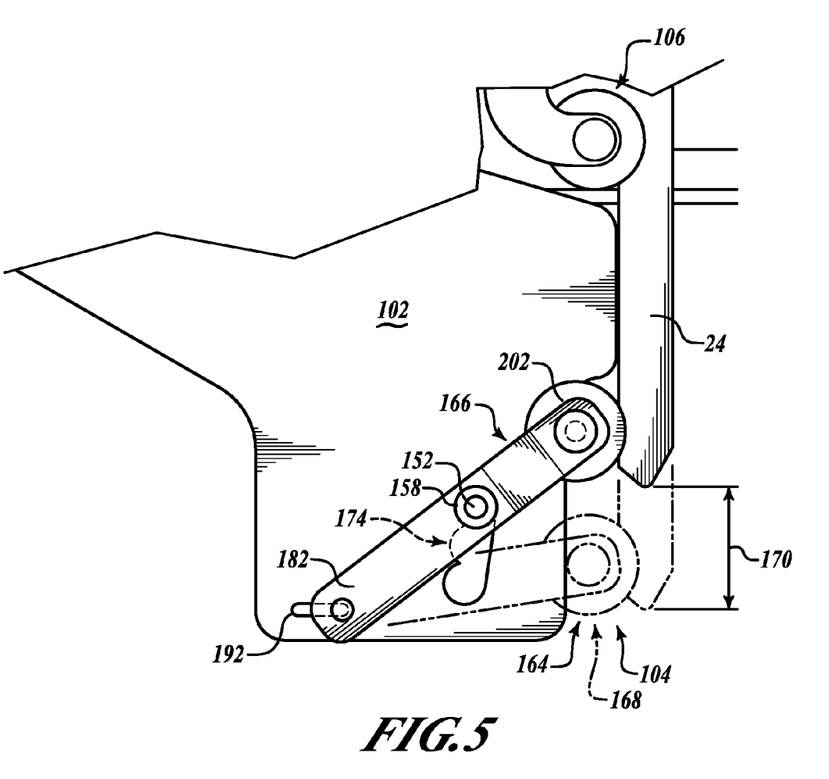
FIG. 5 is similar to FIG. 3 and shows the lower carrier assembly disposed at a different position relative to an upper carrier assembly in accordance with the present teachings.

With reference to FIGS. 2, 3 and 5, the keel blade member 102 can define a channel 150 in which the lower carrier assembly 104 can move to adjust the distance between the lower carrier assembly 104 and the upper carrier assembly 106. The lower carrier assembly 104 can include an adjuster mechanism 152. The adjuster mechanism 152 can include an adjuster member 154 that can be retracted against the bias of a spring 156. By moving the adjuster member 154, a plug member 158 having a cam surface 160 can move out of alignment with an edge 162 of the channel 150 formed in the keel blade member 102. When the cam surface 160 is moved out of alignment with the edge 162, the lower carrier assembly 104 can be moved between positions 164 relative to the keel blade member 102

In one aspect, the positions 164 can include a top position 166, as shown in FIG. 5 and a lower position 168, as shown in FIG. 3 and again illustrated in phantom line in FIG. 5. By way of the above example, the different positions 164 of the lower carrier assembly 104 can be configured to accommodate varying lengths 170 of the cutting blade 24 for certain applications. In turn, the different positions 164 of the lower carrier assembly 104 can be implemented to accommodate differently sized workpieces.

In another aspect, the plug member 158 can have a circular cam surface 172 that can be received by one of the pockets 174 formed from the edge 162 of the channel 150. While three pockets 174, i.e., a first pocket 176, a second pocket 178, a third pocket 180 are illustrated, it will be appreciated in light of the disclosure that varying amounts of the pockets 174 can be defined in the channel 150 in the keel blade member 102 and can be associated with the positions 164 of the lower carrier assembly 104.

By moving the cam surface 160 out of contact with the edge 162 of the channel 150 formed in the keel blade member 102, the lower carrier assembly 104 can be moved relative to the keel blade member 102 to one of the selected positions 164. At one of the selected positions 164, the adjuster member 154 can be moved to an extended condition so that the cam surface 160 of the plug member 158 can again come into contact with the edge 162 of the channel 150 and thus hold the lower carrier assembly 104 in the selected position.

With reference to FIG. 2, the lower carrier assembly 104 can include a pair of arm members 182 that can be fastened together with the keel blade member 102 in between the arm members 182. Each of the arm members 182 can include one or more apertures. For example, a rear aperture 184, a middle aperture 186 and a front aperture 188 can be formed on each of the arm members 182. The rear aperture 184 can accept a fastener 190 that can also be inserted into a groove 192 formed in the keel blade member 102. As the lower carrier assembly 104 is moved relative to the keel blade member 102, the fastener 190 can travel in the groove 192.

One of the middle apertures 186 can be an oversized aperture (relative to other apertures) 194 on one of the arm members 182 so as to accept the plug member 158. The opposed middle aperture 186 on the opposite arm member 182 can accept a portion of the adjuster member 154. In this arrangement, the adjuster member 154 can be inserted through the spring 156 that can be disposed between a surface 196 of one of the arm members 182 and a head 198 of the adjuster member 154. The adjuster member 154 can couple to the plug member 158 (e.g., with mechanical threads) to secure the spring 156 between the head 198 and the surface 196. The front aperture 188 can accept a fastener 200 that can rotatably hold a rolling member 202 between each of the arm members 182. The rolling member 202 can be configured with a groove 204 to accept a rear edge 206 (FIG. 3) of the cutting blade 24.

The keel assembly 100 can further include a keel block 230 that can attach to the keel blade member 102. The keel blade member 102 can define a first protrusion 232 and a second protrusion 234. The first protrusion 232 can include an aperture 236 while the second protrusion 234 can include a second aperture 238. A portion of the keel blade member 102, including the protrusions 232, 234 can be accepted within a groove 240 (shown in broken line) formed within the keel block 230. Fasteners 242 can be passed through apertures 244 formed in the keel block 230 and the apertures 236, 238 formed in the keel blade member 102 near the keel blade member 102 to the keel block 230. In turn, the keel block 230 can connect to the housing 12, as partially shown in FIG. 3.

Figure 8:
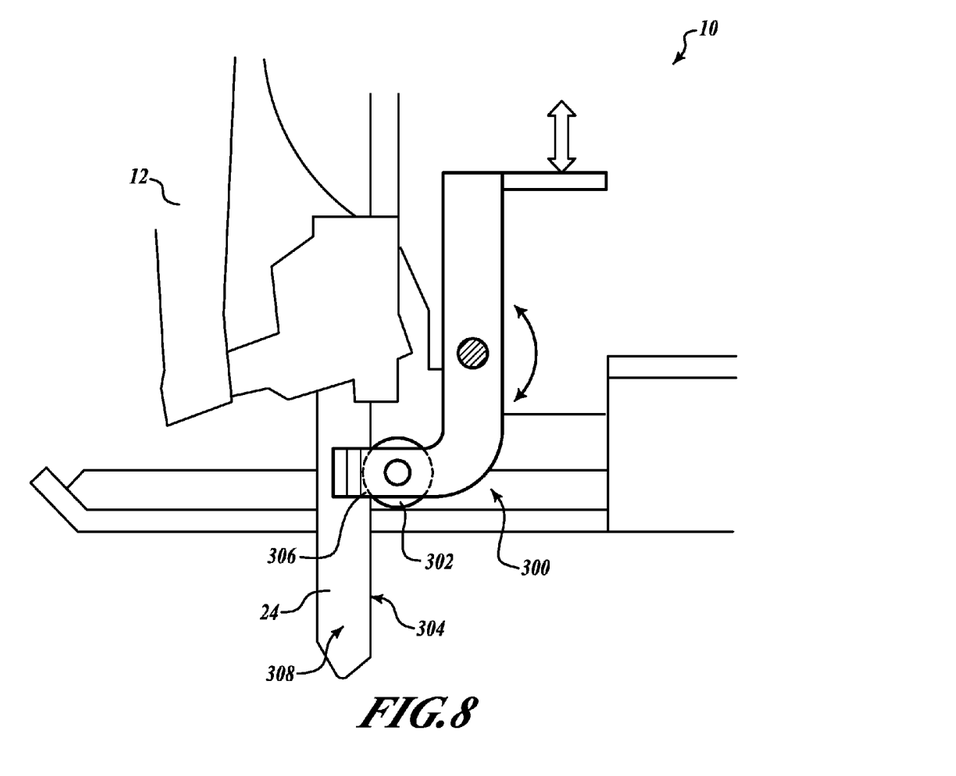
FIG. 8 is a simplified partial cross-sectional side view of a blade guide mechanism showing one of the two guide members that extend from an upper carrier assembly so as to terminate in a position that almost touches the sides of the cutting blade in accordance with a further aspect of the present teachings.
Figure 9:
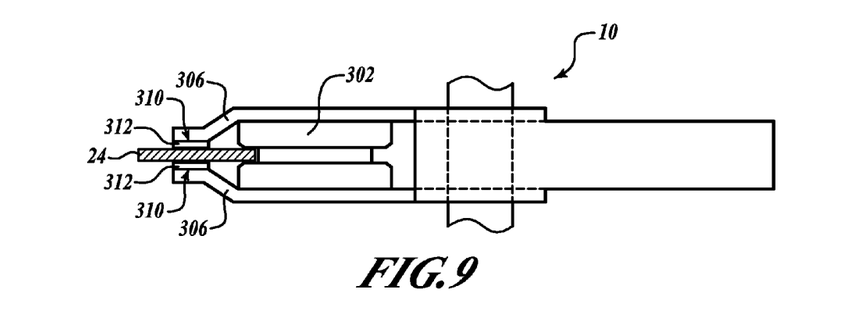
FIG. 9 is a simplified partial cross-sectional top view of the cutting blade and its position relative to hardened ends of the guide members of FIG. 8 in accordance with the present teachings.

With reference to FIGS. 8 and 9, an upper carrier assembly 300 can include a rolling member 302 or other suitable member that can abut a rear (i.e., non-cutting) edge 206 of the cutting blade 24 of the jigsaw 10 in accordance with further aspects of the present teachings. From the upper carrier assembly 300, two guide members 306 can extend and can terminate at a position that almost touches a side 308 of the cutting blade 24. At ends 310 of each of the guide members 306, a hardened portion 312 can be positioned so that when the cutting blade 24 contacts the guide members 306, the cutting blade 24 can contact the hardened portions 312. Each of the hardened portions 312 can be harder than the material of which the guide members 306 are comprised.

When the jigsaw 10 is cutting in a straight line and there is generally no twist imparted on the cutting blade 24, the sides 38 of the cutting blade 24 will not touch the hardened portions 312 of the guide members 306. In other instances, the cutting blade 24 can cut through a workpiece and twist can be imparted on the cutting blade 24 such that the twist of the blade can force the sides 308 of the cutting blade 24 into the hardened portions 312 of the guide members 306. In one example, twisting of the cutting blade 24 can be due to the cutting blade 24 following a grain of wood especially in wet (green) wood.

It may be shown that keeping the guide members 306 and especially the hardened portions 312 in close proximity to the sides 308 of the cutting blade 24 can reduce the twisting of the cutting blade 24 and reduce deviations from a straight cutting line. As such, the ends 310 of the guide members 306 can be kept close enough to the cutting blade 24 to reduce the twist of the cutting blade 24 because the cutting blade 24 can be prevented from twisting (or twisting to such a degree) due to the hardened portions 312 that can at least partially obstruct the sides 308 of the twisting cutting blade 24.

It will be appreciated in light of the disclosure that twisting can be due to forces between the cutting blade 24 and the workpiece 36 and not otherwise due to an optionally implemented scrolling functionality that can impart a twist on the cutting blade 24 to, among other things, make it relatively easier to turn the cutting blade in decorative cutting with the jigsaw.

While specific aspects have been described in the specification and illustrated in the drawings, it will be understood by those skilled in the art that various changes can be made and equivalents can be substituted for elements and components thereof without departing from the scope of the present teachings, as defined in the claims. Furthermore, the mixing and matching of features, elements, components and/or functions between various aspects of the present teachings are expressly contemplated herein so that one skilled in the art will appreciate from the present teachings that features, elements, components and/or functions of one aspect of the present teachings can be incorporated into another aspect, as appropriate, unless described otherwise above. Moreover, many modifications may be made to adapt a particular situation, configuration or material to the present teachings without departing from the essential scope thereof. Therefore, it is intended that the present teachings not be limited to the particular aspects illustrated by the drawings and described in the specification as the best mode presently contemplated for carrying out the present teachings, but that the scope of the present teachings include many aspects and examples following within the foregoing description and the appended claims.

What is claimed is:
1. A jigsaw comprising:
a housing having a rear portion;

a shoe member pivotally connected to said housing and establishing an angle therebetween;

a keel assembly having a front portion and a rear portion with a blade member therebetween, said blade member extends from said housing beyond said shoe member and remains generally in-line with said housing as said angle defined between said shoe member and said housing varies;

a latch assembly that connects said keel assembly to said housing, said rear portion of said keel assembly pivotally connects to said rear portion of said housing where said front portion of said keel assembly is retained or released by said latch assembly, and a lower carrier assembly movable relative to said blade member to establish different positions relative to said shoe member that are adapted to accommodate workpieces of differing sizes, said lower carrier assembly includes an adjuster member having a cam surface and said blade member includes a groove with an edge, said adjuster member is configured to move said cam surface out of an obstructing position with said edge of said groove and into an extended position that restores said cam surface to said obstructing position with said edge of said groove in said blade member.

2. The jigsaw of claim 1, wherein said keel assembly is removable from said housing at a plurality of angles between said shoe member and said housing.

3. The jigsaw of claim 1, wherein said rear portion of said keel assembly includes a lip that permits said rear portion of said keel assembly to pivot about said rear portion of said housing and permits said front portion of said keel assembly to swing into engagement with said latch assembly.

4. The jigsaw of claim 1 further comprising an upper carrier assembly including a carrier member operable to abut a rear edge of a cutting blade and at least two guide members that each extend from said carrier member and terminate at a position that is almost abutting a side of a cutting blade when the cutting blade is in a straight condition but that contacts the side of the cutting blade when the cutting blade twists.

5. The jigsaw of claim 4, wherein each of said guide members includes a hardened portion adapted to contact the side of the cutting blade when the cutting blade twists.

6. The jigsaw of claim 1, wherein said latch assembly includes an actuator member that when retracted into said latch assembly releases said keel assembly from said housing and said actuator member is configured to be retracted by a user by hand operation.

7. The jigsaw of claim 6, wherein said front portion of said keel assembly is released from said latch assembly to swing about a rear portion of said housing.

8. A jigsaw comprising:
a housing having a rear portion;
a shoe member pivotally connected to said housing and establishing an angle therebetween;
a keel assembly having a front portion and a rear portion with a blade member therebetween, said blade member extends from said housing beyond said shoe member and remains in-line with said housing as said angle defined between said shoe member and said housing varies;
a latch assembly that connects said keel assembly to said housing, wherein said front portion of said keel assembly is releasable from said latch assembly to swing about said rear portion of said housing; and a lower carrier assembly movable relative to said blade member to establish different positions relative to said shoe member that are adapted to accommodate workpieces of differing sizes, wherein said lower carrier assembly includes an adjuster member connected to a cam surface, said adjuster member is operable to move said cam surface out of an obstructing position with an edge of a groove formed in said blade member and into an extended position where said cam surface is in said obstructing position with said edge of said blade member.

9. The jigsaw of claim 8, wherein said keel assembly is removable from said housing at a plurality of angles between said shoe member and said housing.

10. The jigsaw of claim 8, wherein said latch assembly includes an actuator member that when retracted into said latch assembly releases said keel assembly from said housing and said actuator member is configured to be retracted by a user by hand operation.

11. The jigsaw of claim 8 further comprising an upper carrier assembly including a carrier member operable to abut a rear edge of a cutting blade and at least two guide members that each extend from said carrier member and terminate at a position that is almost abutting a side of the cutting blade when the cutting blade is in a straight condition but that contacts the side of the cutting blade when the cutting blade twists.

12. A jigsaw comprising:
a housing having a rear portion;
a shoe member pivotally connected to said housing and establishing an angle therebetween;
a keel assembly having a front portion and a rear portion with a blade member therebetween, said blade member extends from said housing beyond said shoe member and remains in-line with said housing as said angle defined between said shoe member and said housing varies;
a lower carrier assembly movable relative to said blade member to establish different positions relative to said shoe member that are adapted to accommodate workpieces of differing sizes;
a latch assembly that connects said keel assembly to said housing, said rear portion of said keel assembly pivotally connects to said rear portion of said housing as said front portion of said keel assembly is retained or released by said latch assembly;
an adjuster member connected to said lower carrier assembly, said adjuster member includes a cam surface that is movable out of an obstructing position with an edge of a groove formed in said blade member to an extended position where said cam surface is in said obstructing position with said edge of said blade member.

13. The jigsaw of claim 12, wherein said rear portion of said keel assembly includes a lip that permits said rear portion of said keel assembly to pivot about said rear portion of said housing and permits said front portion of said keel assembly to swing into engagement with said latch assembly.

14. The jigsaw of claim 12 further comprising an upper carrier assembly including a carrier member operable to abut a rear edge of a cutting blade and at least two guide members that each extend from said carrier member and terminate at a position that is almost abutting a side of a cutting blade when the cutting blade is in a straight condition but that contacts the side of the cutting blade when the cutting blade twists.

15. The jigsaw of claim 14, wherein each of said guide members includes a hardened portion adapted to contact the side of the cutting blade when the cutting blade twists.

16. The jigsaw of claim 14 further comprising an upper carrier assembly including a carrier member operable to abut a rear edge of a cutting blade.

17. The jigsaw of claim 12, wherein said latch assembly includes an actuator member that when retracted into said latch assembly releases said keel assembly from said housing and said actuator member is configured to be retracted by a user by hand operation.

18. The jigsaw of claim 17, wherein said front portion of said keel assembly is released from said latch assembly to swing about a rear portion of said housing.

19. The jigsaw of claim 12, wherein said keel assembly is removable from said housing at a plurality of angles between said shoe member and said housing.

* * * * *